(12) United States Patent
Ng et al.

(10) Patent No.: US 7,647,430 B2
(45) Date of Patent: Jan. 12, 2010

(54) REMOTE COMMAND FRAMEWORK FOR DEVICES

(75) Inventors: Norman N. Ng, Cambridge, MA (US); Michael P. Hart, San Francisco, CA (US); David M. Miller, Redmond, WA (US); Jonathan Wilkins, North Hollywood, CA (US); Kenneth Fern, Bellevue, WA (US); Markham F. MacLin, Kirkland, WA (US); Peter S. Ford, Carnation, WA (US); Scott D. Sanders, Sammamish, WA (US); Walter VonKoch, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 446 days.

(21) Appl. No.: 11/038,632

(22) Filed: Jan. 19, 2005

(65) Prior Publication Data

US 2006/0161662 A1    Jul. 20, 2006

(51) Int. Cl.
G06F 3/00 (2006.01)
G06F 15/16 (2006.01)
G06F 11/00 (2006.01)

(52) U.S. Cl. .............................. 710/5; 709/218; 726/23
(58) Field of Classification Search ..................... 710/5; 709/218; 726/23
See application file for complete search history.

(56) References Cited

U.S. PATENT DOCUMENTS

| 5,623,602 | A * | 4/1997 | Nakashima | 709/235 |
|---|---|---|---|---|
| 7,085,936 | B1 * | 8/2006 | Moran | 726/5 |
| 7,159,149 | B2 * | 1/2007 | Spiegel et al. | 714/43 |
| 2001/0049721 | A1 * | 12/2001 | Blair et al. | 709/203 |
| 2002/0078198 | A1 * | 6/2002 | Buchbinder et al. | 709/224 |
| 2002/0079198 | A1 * | 6/2002 | Nguyen et al. | 198/752.1 |
| 2002/0083153 | A1 * | 6/2002 | Sweatt et al. | 709/218 |
| 2003/0009693 | A1 * | 1/2003 | Brock et al. | 713/201 |
| 2003/0145225 | A1 * | 7/2003 | Bruton et al. | 713/201 |
| 2005/0216955 | A1 * | 9/2005 | Wilkins et al. | 726/23 |
| 2005/0246408 | A1 * | 11/2005 | Chung | 709/200 |
| 2006/0112171 | A1 * | 5/2006 | Rader | 709/218 |
| 2006/0143289 | A1 * | 6/2006 | Smith et al. | 709/224 |
| 2007/0058551 | A1 * | 3/2007 | Brusotti et al. | 370/241 |

FOREIGN PATENT DOCUMENTS

KR    2002009140 A  *  2/2002

* cited by examiner

*Primary Examiner*—Henry W. H. Tsai
*Assistant Examiner*—Tushar S Shah
(74) *Attorney, Agent, or Firm*—Vierra Magen Marcus & DeNiro LLP

(57) ABSTRACT

A robust device messaging framework is disclosed that enables a user to send commands to a device. A provisioning service is used to provision unique device identities and maps user web identities to device identities. The provisioning service also limits device per day provisioning attempts to limit denial of service attacks. A command service allows remote users to issue commands to a device, synchronize outgoing commands with incoming results, receive accurate feedback about whether a command was received, and maintain state information about the device. A device layer encrypts and stores device identities, authenticates itself with the command service, establishes a high-availability Internet connection to receive alerts that a command has issued, and reports results to the server-based command service.

8 Claims, 6 Drawing Sheets

REMOTE COMMAND FRAMEWORK FOR DEVICES

BACKGROUND OF THE INVENTION

1. Field of the Invention

The present invention relates to technology for sending commands to a remote device.

2. Description of the Related Art

Television has become more popular. More and more people have access to cable television and satellite services. As a result, the number of programs available to viewers has increased dramatically. For some users, there is not enough time to watch all of the programs they are interested in. Thus, video recorders are often used.

One type of video recorder that has become popular is the digital video recorder (DVR). In addition to standalone digital video recorders, computers can also be used to record video/television. With the widespread use of the Internet, an opportunity has arisen to have digital video recorders communicate with other devices using the Internet or other networks.

Although digital video recorders have been very useful, they have not satisfied all needs. Most digital video recorders can be programmed to record a show using an interface on the digital video recorder. Thus, a user must be in the same place as the digital video recorder to program it. However, there are situations when a user determines a need to record a program while the user is away from the digital video recorder. Examples include when the user learns of a show to record while the user is traveling or at work. Consider the example of a user planning on going home after work to watch a sporting event; however, the user is asked to work late or go to a social event. If the user were at home, the user could program the digital video recorder to record the sporting event.

In response, some providers of recording equipment have provided a means for remotely instructing a video recording device to record a show. For example, one system digitally records satellite television using a digital video recorder with an internal hard drive. A user can send a request to record a show. This request is sent out by the satellite to all receivers; however, it is addressed to only one receiver. The addressed receiver will act on the command and record the desired show while the other receivers will not. One drawback is that the system does not provide a means for the receiver to respond/acknowledge, so the user does not get any feedback as to whether the command will be successful. Additionally, the system is available only to subscribers of satellite television.

SUMMARY OF THE INVENTION

A device messaging system is disclosed that enables users to issue commands to devices that are remote from the users. For example, a user away from the location of the user's video recording device can issue an instruction to the video recording device requesting that the video recording device record a particular show or segment of television/video. The system provisions unique device identities for the devices to be controlled and maps user Web identities to the device identities. Users can issue commands to a device associated with the respective user. Outgoing commands are synchronized with incoming results, and state information about the devices is maintained. A device layer, associated with the device being controlled, encrypts and stores device identities, authenticates itself with the command service, establishes a high-availability Internet connection to receive alerts that a command has issued, and reports results of commands to the command service. Various safeguards are included to help protect the now-accessible device from security attacks.

One embodiment includes establishing a persistent connection between a target device at a first location and a notifying server, receiving a notification (via the persistent connection) of a command issued from a second location (different from the first location), and responding to the command using the target device at the first location. Another embodiment includes establishing a secure identity for a target entity, associating the secure identity for the target entity With a secure identity for a first user, receiving a command from the first user, associating the command with the target entity based on the association between secure identities, and providing the command to the target entity.

Another embodiment includes receiving a command from a first user at a first location. The command is for a target entity at a second location different from the first location. The command is received at a third location different from the first location and the second location. The command is provided to the target entity from the second location. A result status is received from the target entity. The result status is received at the third location. The result status is provided to the first user.

The present invention can be accomplished using hardware, software, or a combination of both hardware and software. The software used for the present invention is stored on one or more processor-readable storage devices including hard disk drives, CD-ROMs, DVDs, optical disks, floppy disks, tape drives, RAM, ROM, flash memory or other suitable storage devices. In alternative embodiments, some or all of the software can be replaced by dedicated hardware including custom integrated circuits, gate arrays, FPGAs, PLDs, and special-purpose processors. In one embodiment, software implementing the present invention is used to program one or more processors. The one or more processors can be in communication with one or more storage devices, peripherals and/or communication interfaces.

DETAILED DESCRIPTION

The technology described herein allows a user to issue commands to a device that is remote from that user. For example, a user away from the location of the user's video recording device can issue an instruction to the video recording device requesting that the video recording device record a particular show or segment of television/video. The technology described herein can also apply to devices other than a video recording device (e.g., appliances, computers, heating/cooling systems, telephones, lighting systems, and others).

A robust device messaging framework is disclosed that enables the user to associate an existing Web identity with the device the user wishes to control. This device messaging framework allows a user to send messages to and receive messages from the device under control. In one embodiment, the device messaging framework includes a provisioning service, a command service and a device layer. The provisioning service is used to provision unique device identities and map user Web identities to device identities. The command service allows remote users to issue commands to a device, synchronize outgoing commands with incoming results, and maintain state information about the device. Both the provisioning and command service also limit device-per-day provisioning and user-per-period scheduling attempts respectively to limit denial of service attacks. A device layer encrypts and stores device identities, authenticates itself with the command service, establishes a high-availability Internet connection to receive alerts that a command has been issued, and reports results to the command service.

Figure 1:
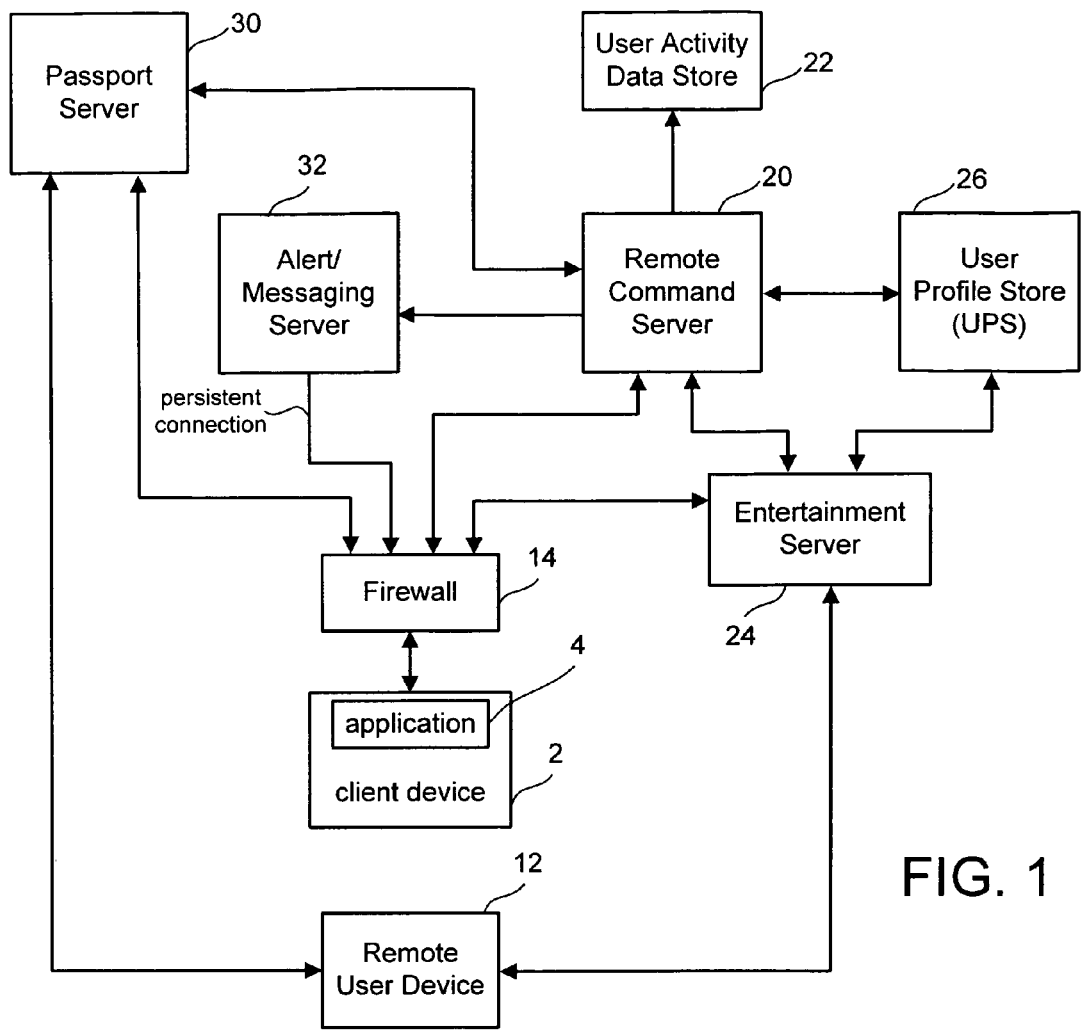
FIG. 1 is a block diagram depicting one example of a system for implementing the present invention.

FIG. 1 is a block diagram of one embodiment for implementing a device message framework. An example of remotely issuing a command to a video recording device will be used. However, the present invention is not limited to that example and can apply to many other devices and/or commands.

Client Device 2 of FIG. 1 includes video recording capability. For example, Client Device 2 can include a digital video recorder (DVR) or a videotape recorder. In other embodiments, Client Device 2 can be an apparatus that interfaces with a DVR, videotape recorder, or other type of recording device. For embodiments that include sending commands to devices other than video recorders, Client Device 2 can be a different type of apparatus. In the configuration of FIG. 1, Client Device 2 is configured to receive commands from a user. In one embodiment, Client Device 2 is a computing device. This can include a computer, hand-held computing device, telephone, recording device, or any other computing device. Client Device 2 runs Application Software 4. In one embodiment, Application Software 4 is used to communicate with the other components of the system and to control Client Device 2.

Remote User Device 12 is a device being operated or controlled by a user. The user and Remote User Device 12 are both remote from Client Device 2. That is, Client Device 2 is in one location and Remote User Device 12 is in a different location. For example, if Client Device 2 is a DVR in the user's home, then Remote User Device 12 can be a computer at the user's office, a hotel room in a remote city, another room in the home or other locations. Remote User Device 12 can be a computing device (including a computer, hand-held computing device, telephone, pager, etc.) or another type of device able to send commands via electronic, optical, acoustical or other means. Typically, Remote User Device 12 will communicate with the various entities depicted in FIG. 1 via a computer network, such as the Internet. Alternatively, Remote User Device 12 can communicate to any one or more of the devices shown in FIG. 1 using telephone lines, wireless communication or other suitable means. For the remainder of this discussion, assume that a user operating Remote User Device 12 wishes to send a command to Client Device 2 so that Client Device 2 will perform some function. For example purposes only, assume that the user of Remote User Device 12 wishes to send a command to Client Device 2 so that Client Device 2 will record a show (or portion of a show or event) being broadcast on television, radio, or another media source.

FIG. 1 also depicts Remote Command Server 20, User Activity Data Store 22, Entertainment Server 24, User Profile Store (UPS) 26, Passport Server 30 and Alert/Messaging Server 32. Remote User Device 12 communicates with Entertainment Server 24 and Passport Server 30 via a network, such as the Internet. However, as described above, communication can be performed using telephone lines, wireless communication or other means.

In one embodiment, Client Device 2 is behind a Firewall 14. Firewall 14 can be any suitable firewall known and used in the art. In many embodiments of a firewall, various levels of packet filtering and Network Address Translation are performed. The device messaging framework only requires a small set of outbound TCP ports to be opened on the Firewall 14. Client Device 2 communicates with Firewall 14 via a local area network. Firewall 14 communicates with the Remote Command Server 20, Entertainment Server 24, Passport Server 30, and Alert/Messaging Server 32 via a network, such as the Internet. Alternatively, communication can be performed using telephone lines, wireless communication, or other means. In some embodiments, Client Device 2 will not be behind a firewall. Remote Command Server 20 is also in communication with Entertainment Server 24, User Profile Store (UPS) 26, User Activity Data Store 22, Passport Server 30, and Alert/Messaging Server 32. Entertainment Server 24 is also in communication with UPS 26. In one embodiment, Remote Command Server 20 will interact with Passport Server 30 using a SOAP XML Web service. The SOAP messages are sent using the Secure Sockets Layer protocol (SSL). Communications will include some type of header for authenticating and/or authorizing the request. The header will include the name of the relevant name space (e.g., the XML name space of the XML elements of the SOAP message). Client Device 2 also interacts with Remote Command Server 20 using SOAP over SSL.

Remote Command Server 20 manages the command service described herein. More information about Remote Command Server 20 will be provided below. User Activity Data Store 22 stores a log of events that are performed within the system. A secure hash is used to obfuscate the device and user IDs in User Activity Data Store 22 in an effort to provide user privacy while still allowing activity to be attributed to a single user or device. UPS 26 stores data for the various users who make use of the device message framework described herein. UPS 26 can include a set of one or more servers that are load balanced. UPS 26 also stores device specific data, such as recording activity history. Entertainment Server 24 provides a website that depicts television listings information. For example, a user can navigate to a website associated with Entertainment Server 24 and see a grid (or other graphical user interface [GUI]). The columns on the grid represent time intervals and each row represents a television channel. The boxes at the intersection of the columns and rows depict the particular shows on the channels at the noted times. In one embodiment, remote commands can be sent in response to viewing information from Entertainment Server 24. In one example, an implementation of Entertainment Server 24 can include two or more television listings servers that are load balanced and in communication with two or more television data servers that store raw television listings data. That raw television listings data is appropriately formatted in the two television data servers.

One embodiment of the implementation depicted in FIG. 1 makes use of a concept called passports. In one embodiment, passports are a grouping of a user name, password, and unique identification for the passport (Passport ID). In some embodiments, the user name can be an email address. The use of a passport can allow a user to have one set of credentials for signing on to multiple services. Additionally, a single sign-on approach can be used for multiple services, whereby a user signs on to one service using the passport and is then authenticated for multiple services so the user will not have to keep providing credentials each time the user accesses a different service associated with the passport. Passport Server 30 is used to manage those passports and perform authentication. In some embodiments, a user can provide its credentials to a passport-enabled device or process. That device or process will then present the credentials to Passport Server 30, which will authenticate the user and return a token (also called a ticket) back to the process or device. That token will include the Passport ID and will be an indication that the user is authenticated. In some embodiments, the token can be encrypted and include a time stamp. If the process that performed the authentication is a website, the token can be stored in the form of a cookie. In some embodiments, the user indirectly provides the credentials for his/her device via provisioning. Device credentials are then stored and managed on the client device without the knowledge of the user In some implementations, the token will not include the Passport ID. The concept of a passport is not required for the present invention. Other embodiments of authentication or no authentication can also be used.

Alert/Messaging Server 32 (which can include one device or a group of devices) can be used in part as an instant messaging system or separately from an instant messaging system. Alert/Messaging Server 32 provides alerts to subscribers and, in some embodiments, can provide instant messages to those subscribers. A subscriber can sign up for alerts, instant messages, or both. In various implementations, Alert/Messaging Server 32 and Passport 30 can be comprised of one or more servers which include one or more data storage systems.

In summary, a remote user operating Remote User Device 12 will interact with Entertainment Server 24. A webpage provided by Entertainment Server 24 will provide the user with the opportunity to issue a command to Client Device 2. If the user issues a command, that command will be sent to Remote Command Server 20. Remote Command Server 20 will forward the command to Client Device 2 for performance on Client Device 2. Client Device 2 will respond back to Remote Command Server 20. That response will be sent back to Entertainment Server 24 for display to the user on Remote User Device 12.

Figure 2:
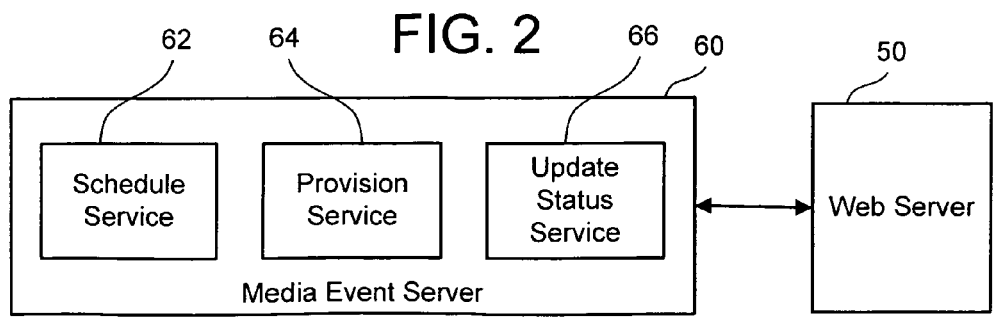
FIG. 2 is a block diagram illustrating one embodiment of a Remote Command Server system.

FIG. 2 provides more details of one implementation of a suitable Remote Command Server 20. In one embodiment, Remote Command Server 20 can include more than one server. For example, Remote Command Server 20 can include a Web Server 50 and Media Event Server 60. In one implementation, Media Event Server 60 is an application server. Note that in other embodiments, more than two servers can be used. Web Server 50 is used to provide a front end to Client Device 2. For example, Web Server 50 can be used to serve Web pages to Client Device 2 and receive communications from Client Device 2. Web Server 50 will serve Web pages based on information from Media Event Server 60 and Client Device 2. Although Media Event Server 60 may run many different processes, three processes are highlighted in FIG. 2, including Schedule Service 62, Provision Service 64 and Update Status Service 66. Schedule Service 62 is used to direct the scheduling of a command. Update Status Service 66 maintains the status of a command. Provision Service 64 is used to provision unique device entities and map user Web entities to these device entities. More details about these services will be described below.

Figure 3:
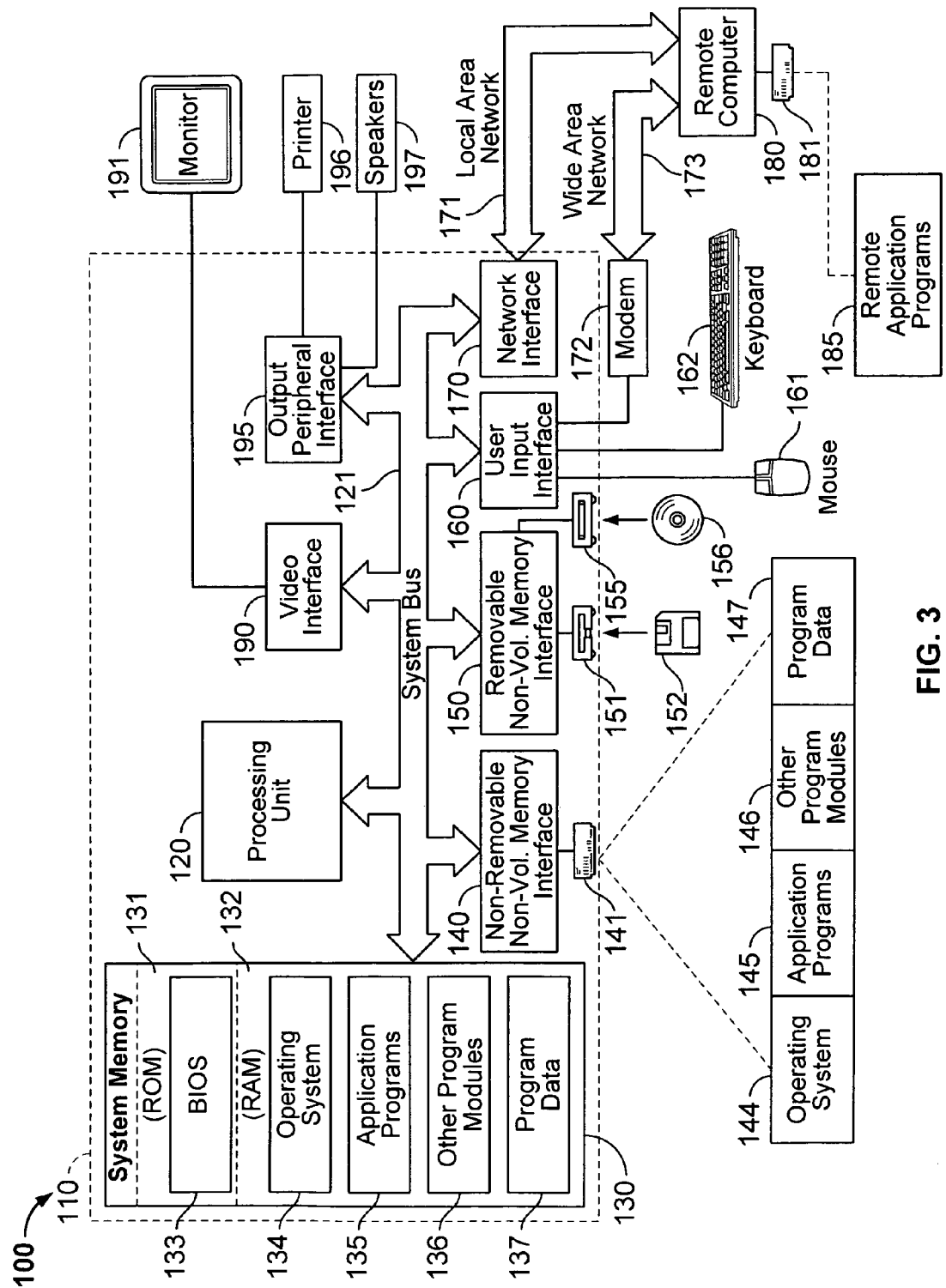
FIG. 3 is a block diagram of one example of a computing system.

FIG. 3 illustrates an example of a suitable general computing environment 100 that may be used as client device 10, remote user device 12, media event server 60, web server 50 or any of the servers depicted in or referred to by FIG. 1.

The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, personal digital assistants, telephones (wired, wireless, or cellular), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 3, an exemplary system for implementing the invention includes a general purpose computing device in the form of a computer 110. Components of computer 110 may include, but are not limited to, a processing unit 120 (which can include multiple processors), a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 3 illustrates operating system 134, application programs 135, other program modules 136, and program data 137.

The computer 110 may also include other removable/non-removable, volatile/nonvolatile computer storage media. By way of example only, FIG. 3 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 3, provide storage of computer readable instructions, data structures, program modules and other data for the computer 110. In FIG. 3, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 3. The logical connections depicted in FIG. 3 include a local area network (LAN) 171 and a wide area network (WAN) 173, but may also include other networks. Such networking environments are commonplace in offices, enterprise-wide computer networks, intranets and the Internet.

When used in a LAN networking environment, computer 110 is connected to LAN 171 through a network interface or adapter 170. When used in a WAN networking environment, computer 110 typically includes a modem 172, network interface or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 3 illustrates remote application programs 185 as residing on memory device 181. It will be appreciated that the network connections shown are exemplary and other means of establishing a communications link between the computers may be used.

Figure 4:
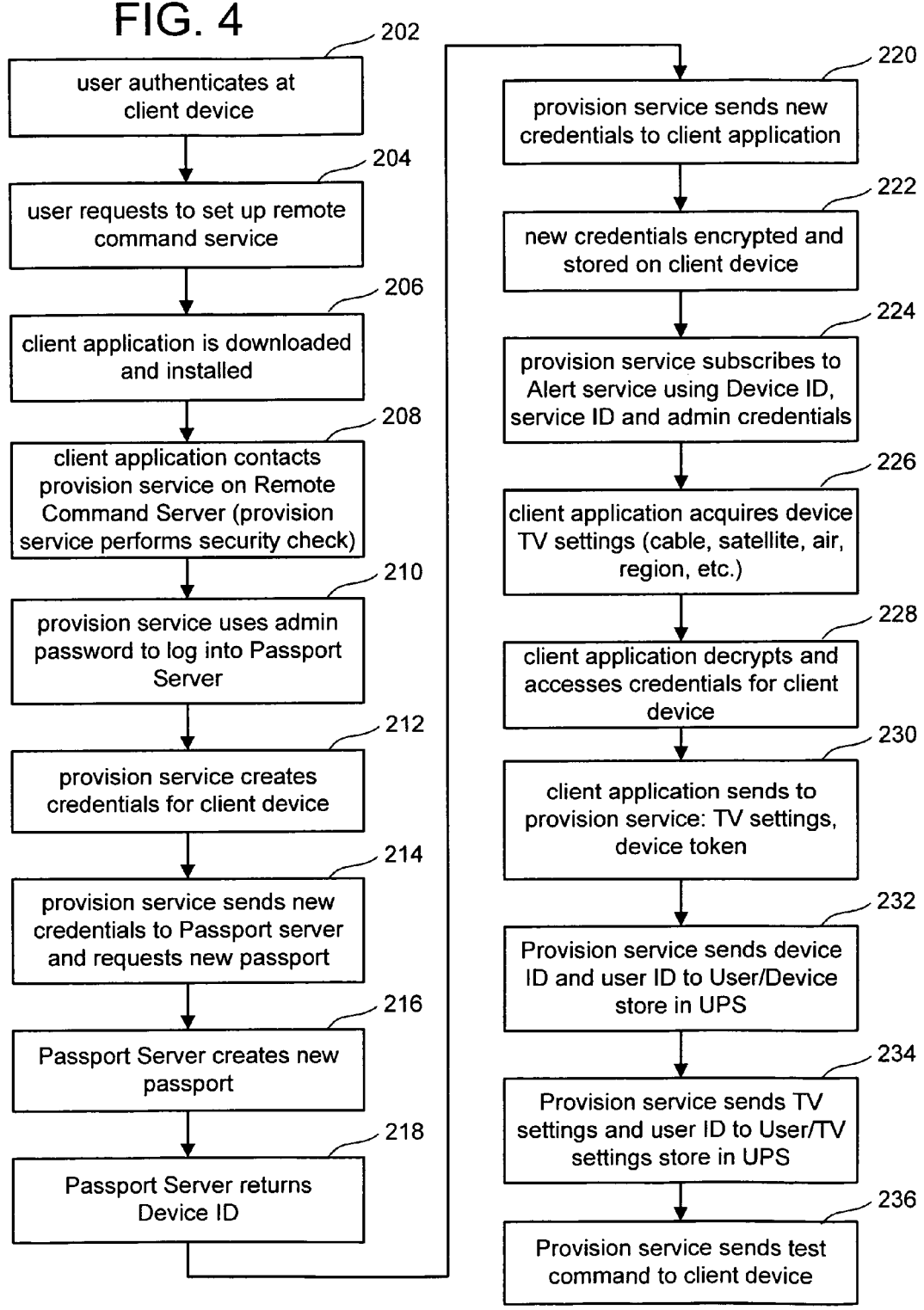
FIG. 4 is a flow chart describing one embodiment of a process for provisioning.

In order for a user to send commands to a device, that device must first be provisioned. In one embodiment, the user can initiate a provisioning process by using Client Device 2 to access a particular website for the purpose of starting a provisioning process. Alternatively, Client Device 2 can include the application to start the provisioning process. Additionally, other means for starting the provisioning process can also be used. FIG. 4 is a flow chart describing one embodiment for performing a provisioning process. In one embodiment, in order to perform the process of FIG. 4, the user must be logged in to Client Device 2 as the local administrator. In step 202, the user authenticates at the Client Device 2. This includes the user providing the user name and password. These credentials are sent to Passport Server 30, which returns a token, if the user properly authenticates. That token is then stored on Client Device 2. In one embodiment, a token stores the user's Passport ID. In other embodiments, the token can be used to access the Passport Server 30 and receive a token ID in response thereto. In some cases, client device 2 will store user credentials (username and password), if the token expires over time. In one implementation, step 202 can be performed prior to the process of FIG. 4 and, thus, does not need to be repeated. In step 204, the user requests to set up the remote command service. This can be done using a Web page, application, or other means. In step 206, Client Application 4 is downloaded from Remote Command Server 20 and installed on Client Device 2. In step 208, Client Application 4 contacts Provision Service 64 on Media Event Server 60 of Remote Command Server 20.

In one embodiment, step 208 of FIG. 4, Provision Service 64 will determine whether there has been a previous attempt to provision this particular device during a preset period of time, for example, if the device had attempted to be provisioned within the last day. If so, Provision Service 64 will terminate the provisioning process. This will prevent a device from being provisioned more than once in a day or more than once (or a different number) in another predefined time period. Such a feature is used as a security measure to prevent a hacker from attempting to require a large number of provisions to overload the system.

In step 210, Provision Service 64 uses its prestored administrative password to log in to Passport Server 30 as an administrator for a domain associated with user devices subject to the technology described herein. In one embodiment, a separate domain name will be used for all such devices (e.g., msntv-devices.com). In step 212, Provision Service 64 creates a user name and password for the Client Device 2 being provisioned. In one embodiment, the user name and password are created randomly. In other embodiments, various schemes can be used to create the user name and password. The manner in which the user name and password are chosen is not important to the invention described herein as long as the user name is uniquely identifiable.

In step 214, as an administrator, Provision Service 64 sends the new credentials (user name and password for Client Device 2) to Passport Server 30 and requests a new passport be created. In step 216, Passport Server 30 creates the new passport. In step 218, Passport Server 30 provides the Passport ID and token for the new passport to Media Event Server 60. In some embodiments, only the Passport ID will be returned. In other embodiments, only the token will be returned. The discussion above has made reference to a Passport ID for the user and a Passport ID for the device. To prevent confusion, the Passport ID for the user will be referred to as the User ID and the Passport ID for the device will be referred to as a Device ID.

In step 220, Provision Service 64 sends the new credentials to Client Application 4. In step 222, these new credentials are stored on Client Device 2. In one embodiment, the credentials are encrypted in such a way that they can only be decrypted from the same Client Device. This prevents users from hijacking device control by manually transferring the encrypted credentials across devices. In step 224, Provision Service 64 subscribes to an alert service on Alert/Messaging Server 32 on behalf of Client Device 2. Provision Service 64 provides Alert/Messaging Server 32 with the Device ID for Client Device 2, a Service ID, and administrative credentials. The administrative credentials are provided to verify that Remote Command Server 20 has the appropriate authority to make such a subscription. The Service ID provided in step 224 identifies that the alerts are for the message framework described herein, as differentiated from alerts for instant messages, emails, etc. from other alert providers.

In step 226, Client Application 4 will acquire the television settings for Client Device 2. This may include one or more indications of whether the video recording device is associated with over-the-air broadcast, cable television, satellite television, etc. Settings may also include what region of the country, whether daylight saving time is observed, and any other configuration needed by a tuner. In step 228, Client Application 4 accesses the credentials for the Client Device 2 stored on Client Device 2 and logs on to Passport Server 30 in order to receive the appropriate token. In step 230, Client Application 4 sends the television settings from step 226 and the device token to Provision Service 64. The token is retrieved by the Entertainment server after user authenticates on the web page and performs download in step 204. The Entertainment web server than forwards this along with the TV settings and device token coming in from the client application to the Provision Service using a trusted connection. In step 232, Provision Service 64 sends the device ID and the User ID to a user/device store in UPS 26. That is, one of the storage systems associated with UPS 26 is a data structure for storing associations of User IDs to Device IDs. Provision Service 64 can acquire the device IDs by presenting the tokens to Passport Server 30 and receiving the IDs back. Alternatively, Provision Service 64 can determine the IDs from the tokens. In yet another embodiment, Client Application 4 can have access to and send the Device ID and User ID directly to Provision Service 64. The purpose of the user/device store is that when a user issues a command when interacting with Entertainment Server 24, Entertainment Server 24 can then access the user/device store on UPS 26 to determine which device needs to be programmed. In step 234, Provision Service 64 sends the television settings it received from Client Application 4 and the user ID to a user/television setting store in UPS 26. When a user accesses Entertainment Server 24, Entertainment Server 24 can determine user's television settings and show the appropriate TV data. Additionally, when sending a command to Client Device 2, the user's TV data can be used to properly configure the command so the appropriate channel and/or other tuner settings are selected. In step 236, Provision Service 64 sends a test command to the client device.

At the end of the process of FIG. 4, the system in FIG. 1 is now configured so that a particular Client Device 2 can receive commands remotely from a user. If an additional user wants to be able to remotely program or send commands to Client Device 2, steps 202 and 226-234 must be performed for the additional user.

Figure 5:
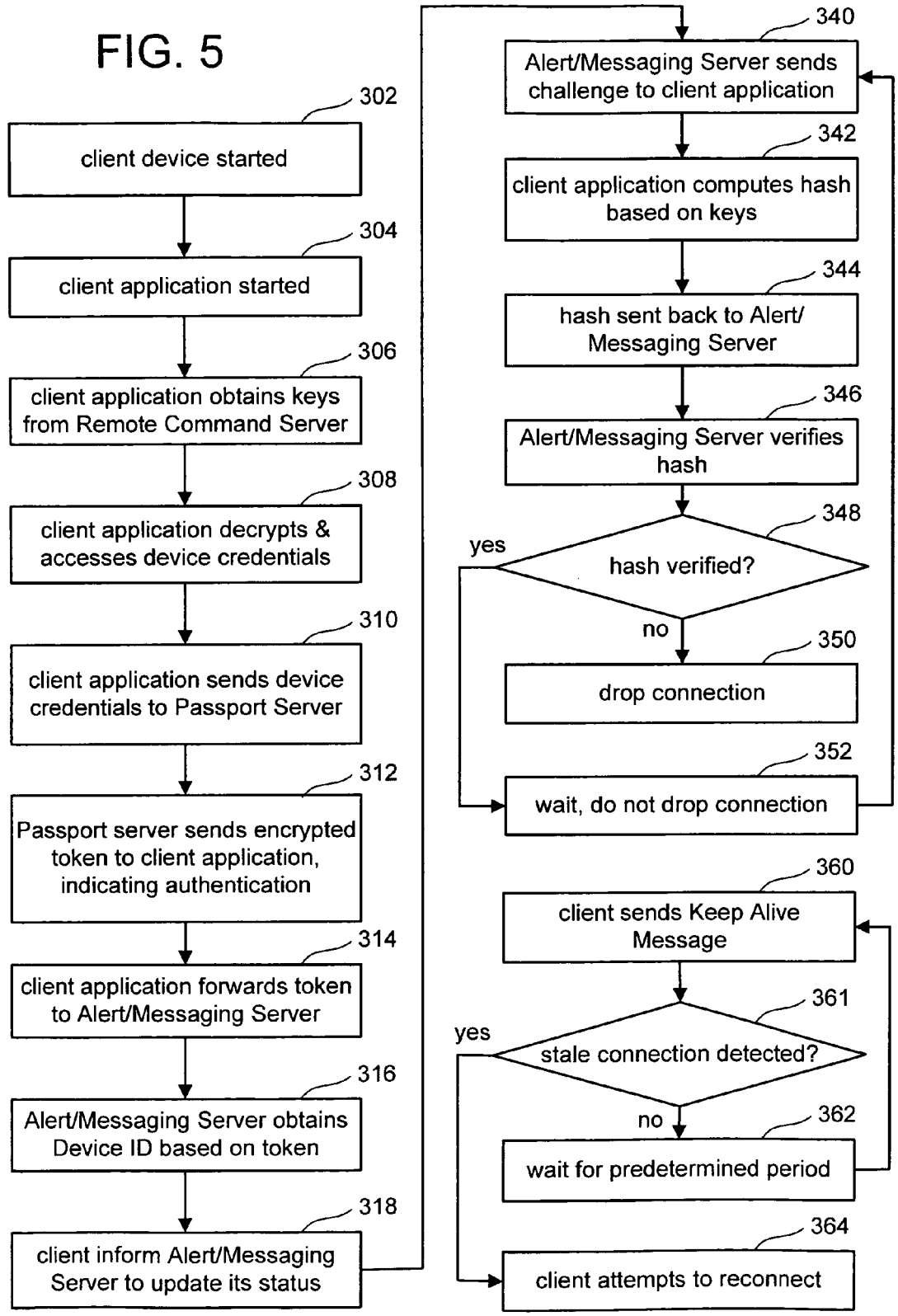
FIG. 5 is a flow chart describing one embodiment of a process performed when a client is started.

FIG. 5 is a flow chart describing one embodiment of a process performed when a Client Device 2 becomes operational on the device messaging framework of FIG. 1. The process of FIG. 5 can be performed when a Client Device 2 is turned on, booted, reset, resumed after stand-by or otherwise triggered. In step 302, Client Device 2 is started by any suitable means. In step 304, Client Application 4 starts. In step 306, Client Application 4 obtains one or more keys from Remote Command Server 20. As will be explained below, Alert/Messaging Server 32 provides challenges from time to time to Client Device 2. The keys obtained in step 306 will be used to respond to those challenges. In step 308, Client Application 4 accesses and decrypts the device credentials for Client Device 2. These are the credentials that were stored in step 222 of FIG. 4. In step 310, Client Application 4 sends those device credentials to Passport Server 30. In step 312, Passport Server 30 will authenticate based on the credentials and send the encrypted token back to Client Application 4 indicating that the Client Device 2 was properly authenticated. In step 314, Client Application 4 forwards the token to Alert/Messaging Server 32. Receipt of the token by Alert/Messaging Server 32 indicates that Client Device 2 is properly authenticated and available to receive alerts. In step 316, Alert/Messaging Server 32 will obtain the Device ID for Client Device 2 based on the token. In one embodiment, the device ID can be derived from the token. In other embodiments, the token will be presented to Passport Server 30 in order to receive the Device ID. In step 318, Client Application 4 notifies the Alert/Messaging Server 32 to update the connection status of Client Device 2 to indicate that Client Device 2 is ready to receive alerts.

In step 340, Alert/Messaging Server 32 will send a challenge to Client Application 4. Step 340 can be performed right after step 318 or at some point later. The challenge from Alert/Messaging Server 32 is generally used to make sure that the connection is still working and/or to prevent some firewalls/gateways using Network Address Translations (NAT) from automatically closing idle sockets. The system can also use these pings to test the latency between the client and server. The challenge includes a challenge string. For example, in one embodiment, the challenge string can include a 20-digit number. Other challenge strings can also be used. Within a certain period after sending out the challenge string, Alert/Messaging Server 32 must receive a response (e.g., 50 seconds). In step 342, the Client Application 4 will compute a hash of the challenge string using the keys received in step 306. The hash is some predefined set of mathematical operations that uses the keys. The result of the hash is a string. That result is sent back to Alert/Messaging Server 32 in step 344. In one embodiment, Alert/Messaging Server 32 can use the same keys to convert the hash back to the original challenge string. In another embodiment, Alert/Messaging Server 32 performs the same hashing technique and compares the resulting hash to ensure that Client Application 4 rightfully responded to its challenge. In step 346, Alert/Messaging Server 32 will verify that the hash is correct. If the hash is not correct, the connection is dropped in step 350. If the hash is correct, the connection will not be dropped (step 352). At this point, Alert/Messaging Server 32 will wait some period of time and then send a new challenge (loop back to step 340). There is no set period for sending challenges; they can be sent at any time.

In addition to the loop provided by steps 340-352, Client Application 4 will take measures to ensure that the connection between Client Device 2 and Alert/Messaging Server 32 is a persistent connection. To do this, Client Application 4 will send a keep-alive message to Alert/Messaging Server 32 via the connection between Client Device 2 and Alert/Messaging Server 32 in step 360. Client Application 4 will then wait a predetermined period of time (step 362), and send another keep-alive message. If such message detects a termination of the connection by the server (step 361,) Client Application 4 will attempt to perform the connection process again (step 364) to regain connectivity with Alert/Messaging Server 32. Thus, keep-alive messages are sent periodically to maintain the persistent connection between Client Device 2 and Alert/Messaging Server 32. When a firewall is being used that performs NAT, the persistent connection will include a persistent connection between Client Device 2 and Firewall 14, as well as a persistent connection between Firewall 14 and Alert/Messaging Server 32. The persistent connection can be maintained using TCP, UDP or another suitable protocol. The persistent connection provides a mechanism for Alert/Messaging Server 32 to send alerts to a Client Device 2 behind a firewall. In one embodiment, keep-alive messages are sent every two hours, every one hour, every "x" minutes, every "y" seconds, etc. These keep-alive messages can simply be a ping from the Client Device 2 to the Alert/Messaging Server 32. In some embodiments, the keep-alive message will require a response from the server. If the server does not respond, the client will assume the connection has been dropped and will reconnect. In some embodiments, the client's server firewall can be set so that a socket is kept alive until it is intentionally turned off.

In one embodiment, the system can limit the number of times a client can be started (the process in FIG. 5) during a particular day or other time period (e.g., only once per ten seconds or once per one minute). Thus, in step 304, Client Application 4 can test when the last time it was started, and if it was started within the time period, the process will terminate. In another embodiment, the test can be performed by either Passport Server 30, or Alert/Messaging Server 32. Limitations are also made on the number of scheduling requests (se below).

FIG. 5 describes how to start a client. In one embodiment, a client can be stopped by accessing a graphical user interface for Client Application 4, navigating to a website that will instruct Client Application 4 to turn off or another suitable method. Each of these methods requires the user to be logged in to Client Device 2 as a local administrator.

Figure 6:
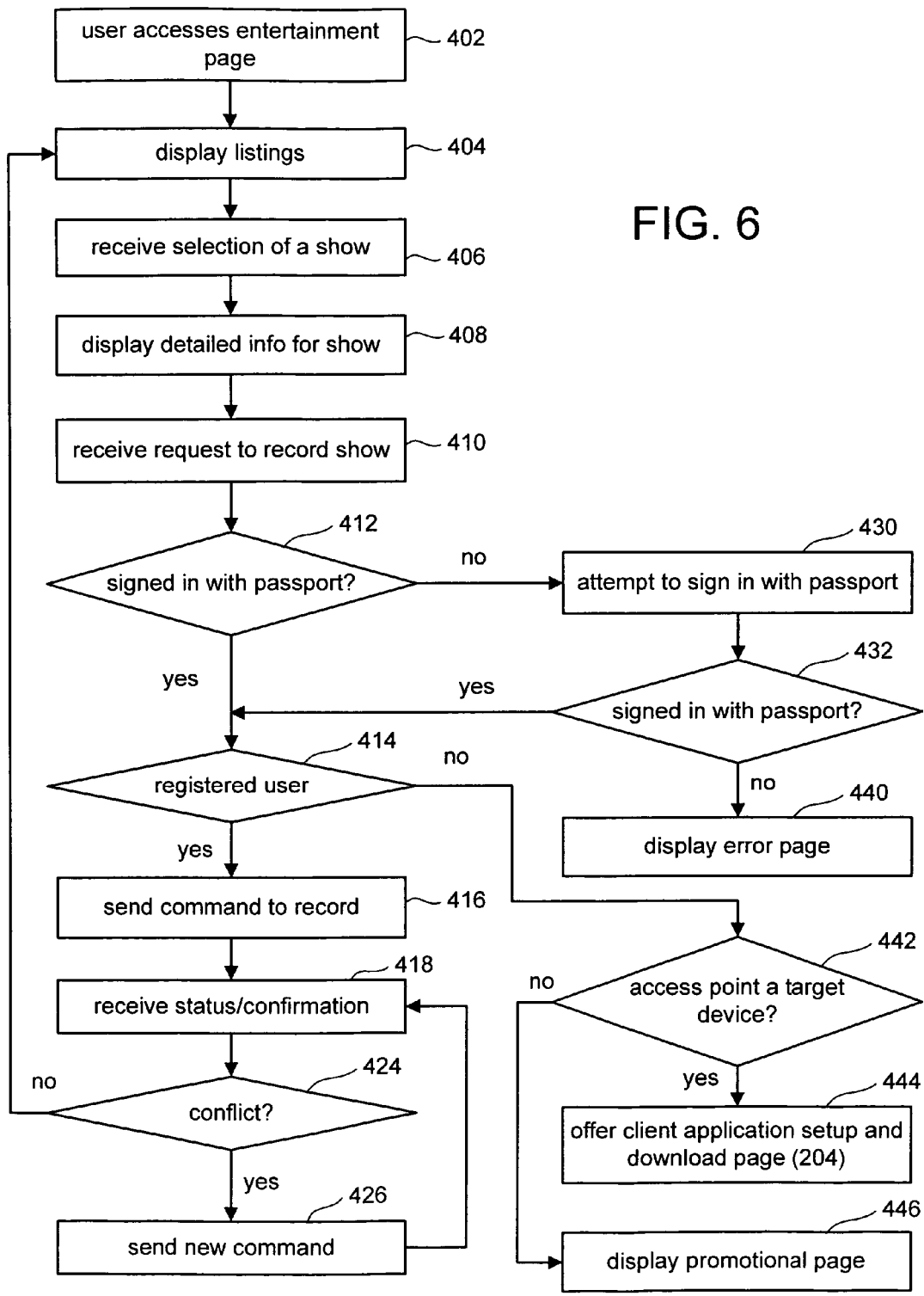
FIG. 6 is a flow chart describing one embodiment of a process performed when a user sends a command.

FIG. 6 provides a flow chart for one embodiment for sending commands to a remote device. In step 402, the user will access an entertainment page served by Entertainment Server 24. For example, the entertainment page can be television guide listings as described above. In step 404, the television guide listings will be displayed to the user. In step 406, the user will select a show by clicking on that portion of the television guide listings. A new page will be displayed in step 408 which provides more information about the show. In one embodiment, the page displayed in step 408 includes the title of the show, a list of actors in the show, the channel, time, category (e.g., news, drama, game show, etc.), rating, future airings and a synopsis. The page will also include a button (or other input item) for recording this show. In other embodiments, there could be a button (or other input item) for recording all airings of or the entire series for this show. In yet another embodiment, the details of a show can be pre-authored as a part of a link to allow one-click recording of a show when such link is presented with other related content. In step 410, the user requests the show to be recorded (or the series to be recorded) by selecting the appropriate button. The request to record a show is initially received by Entertainment Server 24 and forwarded to Remote Command Server 20.

In one embodiment of step 410 of FIG. 6, the system will include a check to determine how many times the same user has submitted a request to record. If too many requests are received during a predetermined period of time, these requests will be ignored or be responded to in a slower fashion. In step 412, it is determined whether the user has signed in with the user's passport. If so, then it is determined at step 414 whether the user is registered to use the command message framework. If the user performed the provisioning process of FIG. 4, then the user is registered. Otherwise if the device from which the request originates from is an appropriate device type (step 442), then the user will be offered to setup and download the Client Application 4 (step 444.) If the user is not registered (step 414) and the client device is not the appropriate device type, then the user will receive a promotional page to advertise the service.

If the user is registered than, in step 416, a command to record the particular show is provided to Client Device 2 by sending a notification of a new command to the client device which then connects back to the server to retrieve the command. After providing the command to Client Device 2, Entertainment Server 24 (or Remote Command Server 20) will display status information. For example, a page may indicate that the request is being sent and will ask the user to wait while the request is processed. That page may also request that the window not be closed until the user sees confirmation of the request. When Entertainment Server 24 receives confirmation that the request has been properly delivered, a confirmation page will be displayed indicating that the command to record was received and successfully scheduled. That confirmation may also include the title of the program, the time of the program, the channel, and the title of the show. If in the event Client Device 2 is not connected to the Alert/Messaging Server 32 when the command is dispatched, Schedule Service 62 will attempt to retry sending the command at regular intervals until a certain end time is met and/or if the command is no longer deemed useful.

In some embodiments, there can be a conflict with a particular command (step 424); for example, if two or more shows to be recorded overlap in time. If so, then in step 426, a conflict resolution page allows the user to cancel the current request or perform the current request while overriding a previous request. In either case, a new command is sent to the Client Device 2 to either cancel the previous request or overwrite an earlier request. The process then loops back to step 418. If there was no conflict, Entertainment Server 24 will redisplay the listings page in step 404.

If in step 412 it is determined that the user was not signed in with the user's passport, then in step 430 Entertainment Server 24 attempts to authenticate the user. The user is provided an opportunity to present the user's credentials. Those credentials are presented to Passport Server 30. If the user successfully authenticates with Passport Server 30 and a token is received back at Entertainment Server 24, then the process continues at step 414. If the user does not authenticate properly (step 432), then an error page is displayed in step 440.

Additionally, while accessing the entertainment page of Entertainment Server 24, a user can be provided with one or more items (tab, button, link, etc.) to access a My Recordings page. By accessing that input item, a page will be displayed that shows the history of all commands by that user during a predefined time period. This history is obtained by accessing the recordings store in UPS 26 to find all entries that include the User ID of interest.

Figure 7:
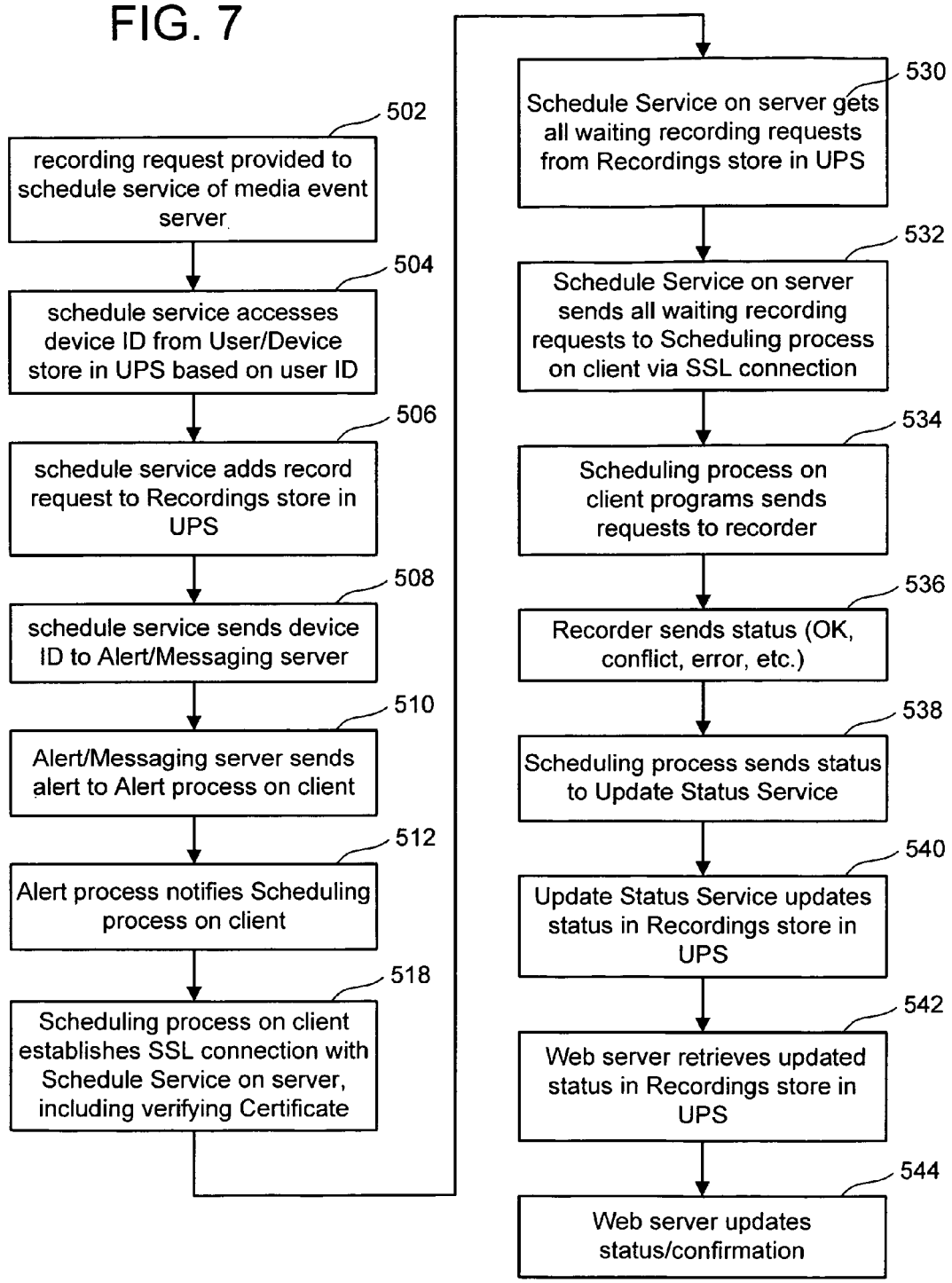
FIG. 7 is a flow chart describing one embodiment of a process for sending a command to a remote device.

FIG. 7 is a flow chart describing one embodiment of a process for sending a command to a user device (see steps 416 and 426 of FIG. 6). In step 502, the recording request is provided to the Schedule Service 62 of Media Event Server 60 from Entertainment Server 24. In step 504, Schedule Service 62 accesses the Device ID from the user/device store in UPS 26. Using the User ID as a key to the user/device store, the appropriate Device ID can be accessed. The User ID is obtained by Schedule Service 62 from Entertainment Server 24 because the user logged in using the user's passport. In step 506, Schedule Service 62 adds the record command to the recordings store in UPS 26. The recordings store is a data structure that stores an entry for each command. Each entry includes the user ID, device ID, and the details of the command. In one embodiment, the user ID is obfuscated for privacy reasons. In step 508, Schedule Service 62 sends a reference to the entry in the recordings store and the Device ID to Alert/Messaging Server 32. In step 510, Alert/Messaging Server 32 creates an alert and sends an alert to Client Device 2. The alert includes a time stamp, the reference to the entry in the recordings store, and an URL to Alert/Messaging Server 32. The alert is sent via the persistent connection between Alert/Messaging Server 32 and Client Device 2. In step 512, an alert process running within Client Application 4 receives the alert and notifies a scheduling process running on Client Application 4. In step 518, the scheduling process on Client Application 4 establishes an SSL connection with Schedule Service 62 of Media Event Server 60. As part of establishing the SSL connection, Remote Command Server 20 will send a certificate to Client Device 2. The certificate is used during the establishment of a secure connection according to the SSL protocol for establishing a secure connection. In step 530, Schedule Service 62 will access all of the recording requests stored in the recordings store of UPS 26 that have not already been sent to Client Device 2. In step 532, Schedule Service 62 sends the recording request accessed in step 530 to the scheduling process on Client Application 4 via the SSL connection. In step 534, the scheduling process on Client Application 4 will send the request to the recording device. In one embodiment, Client Device 2 is a computer running Microsoft XP Media Center Edition 2005. That operating system includes an application programmer's interface (API) for instructing the computer to record shows and do other commands. Step 534 includes using that API to request the computer to record the designated show. In step 536, a status will be provided by the API back to the scheduling process of Client Application 4 to indicate the status of the recording request. The status could indicate a successful request, an error, or a conflict. If there is a conflict, the information pertaining to the conflict can also be provided back to Client Application 4. In step 538, the scheduling process in Client Application 4 sends the status information to Update Status Service 66 of Media Event Server 60. In step 540, Update Status Service 66 updates the status of each entry in the recordings store of UPS 26. In step 542, the Web server will retrieve the updated status in the recordings store in UPS 26, and in step 544 that updated information will be used to provide status or confirmation (success, failure, cause of problems, conflicts, etc.) to the user. Note that step 544 can be performed entirely by Web Server 50, Entertainment Server 24, a combination of both, or other entities.

In step 532 of FIG. 7, the Schedule Service 62 sends a set of one or more recording requests to Client Device 2. Each recording request is packaged in a data structure that includes the following fields: time of scheduling, show ID, show date/time, channel ID, tuner position, call letters, recording type, recording state, and show title. In addition, other implementations may use more or fewer fields than described above. For example, Series Title and Series ID can also be included. The time of scheduling field indicates the date and time that the user made the request for the recording. The show ID field is an identification of the show used by the TV listings data. The show date/time indicates the year, month, date, hour, minute, and second of the start time of the show in coordinated universal time (UTC) format. The channel ID is a unique channel ID that the show is being broadcast on. The tuner position is used for some tuners that have different positions (e.g., Antenna A vs. Antenna B, Video Input 1 vs. Video Input 2, etc.). The call letters field indicates the call letters for the particular channel ID (e.g., FOX, ABC, etc.). Recording type indicates whether the command is for recording a single show, a series, a cancellation of a request for recording the above information, or a request to record while overriding any previous requests. The recording state indicates the status of the request, including scheduled, invalid user, user not registered, service error, client cannot be reached, client has not responded, client version outdated, user disabled, conflict not scheduled, already scheduled, schedule not found, or unknown error. The show title field is a string indicating the title of the show.

The reason there is an SSL connection between Client Device 2 and Remote Command Server 20 is so that only the appropriate Remote Command Server 20 can issue recording commands to the Client Device 2 to avoid an unauthorized entity from issuing commands.

Client Application 4 will also periodically check with Schedule Service 62 for updates to its software. Client Application 4 provides means to notify user of any available updates and to perform the upgrade. Upgrades are downloaded and installed on top of any existing copies of Client Application 4. Client Application 4 is restarted appropriately to reestablish connectivity after the upgrade. Provisioning may be triggered again along the upgrade process if necessary as determined by Schedule Service 62.

Appropriate test facilities, including but not limited to web pages, are available for users to test connectivity between their Client Device 2 and the Remote Command Server 20.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others killed in the art to best utilize the invention in various embodiments and with various modifications as are suited to the particular use contemplated. It is intended that the scope of the invention be defined by the claims appended hereto.

We claim:

1. A method for executing a command issued by a remote user device to a target device, comprising:
   receiving a command issued by the remote user device, wherein the command is received by a first server;
   storing the command received by the first server in a database;
   establishing a persistent connection between the target device and a notifying server by having the target device periodically send a keep-alive message to the notifying server and attempt to reconnect to the notifying server if the target device detects that the connection between the target device and the notifying server has been terminated;
   generating a notification that a command has been issued from the remote user device, said notification contains a reference to the location the command is stored in the database;
   providing the notification to the target device from the notifying server via the persistent connection;
   in response to receiving the notification, establishing a connection between the target device and the first server, and retrieving the command from the database via the first server based on the reference to the location of the stored command contained in the notification; and
   executing said command on the target device.

2. A method according to claim 1, wherein:
   executing said command comprises recording a television program.

3. A method according to claim 1, wherein:
   executing said command comprises causing a recording device to record a television program.

4. A method according to claim 1, further comprising:
   establishing a secure identity for said target device; and
   associating said secure identity for said target device with a secure identity for a first user, said command is issued from said first user.

5. A method according to claim 1, further comprising:
   receiving said command from a user;
   associating said command with said target device;
   sending said notification to said target device;
   establishing a secure connection with said target device; and
   providing said command to said target device via said secure connection.

6. A method according to claim 1, wherein:
   said notification is an alert.

7. A method according to claim 1, wherein:
   said target device communicates with said notifying server through a firewall.

8. A method according to claim 1, wherein:
   said target device includes a video recording device; and
   said command includes an instruction for said video recording device to record television programming.

* * * * *

UNITED STATES PATENT AND TRADEMARK OFFICE
CERTIFICATE OF CORRECTION

PATENT NO.       : 7,647,430 B2
APPLICATION NO. : 11/038632
DATED            : January 12, 2010
INVENTOR(S)      : Ng et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 825 days.

Signed and Sealed this

Sixteenth Day of November, 2010

David J. Kappos
*Director of the United States Patent and Trademark Office*